Feb. 21, 1933.  E. S. HUFF  1,898,728
TACHOMETER GENERATOR
Filed June 8, 1929
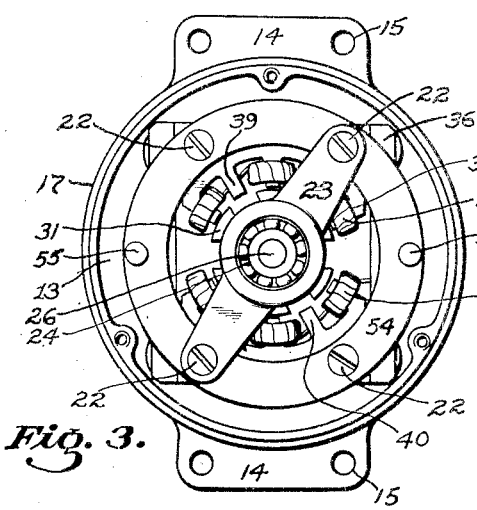
Fig. 3.
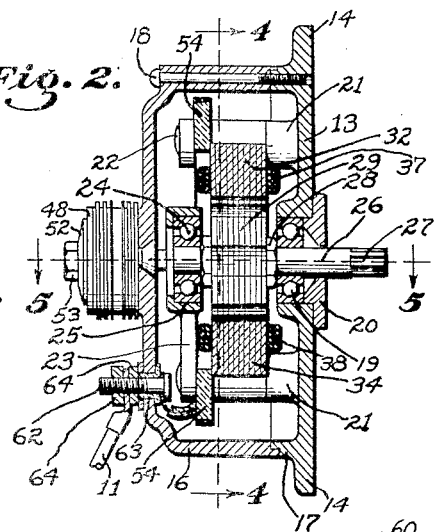
Fig. 2.
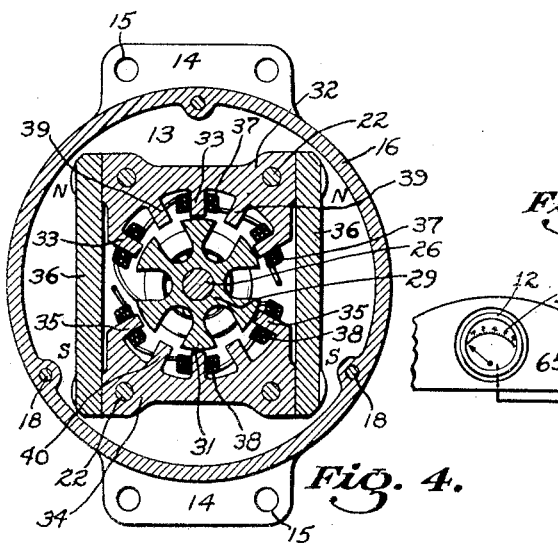
Fig. 4.
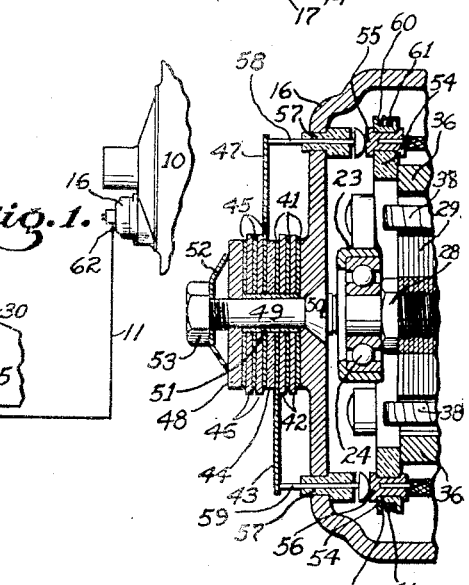
Fig. 1.
Fig. 5.
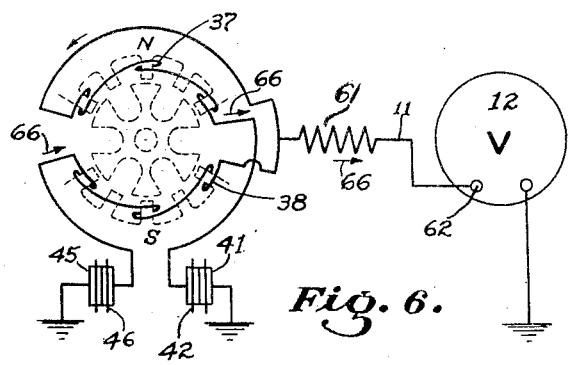
Fig. 6.
INVENTOR
E. S. Huff.
BY
E. L. Davis.
ATTORNEY Patented Feb. 21, 1933

1,898,728

UNITED STATES PATENT OFFICE

EDWARD S. HUFF, OF DEARBORN, MICHIGAN, ASSIGNOR TO FORD MOTOR COMPANY, OF DEARBORN, MICHIGAN, A CORPORATION OF DELAWARE

TACHOMETER GENERATOR

Application filed June 8, 1929. Serial No. 369,500.

The object of my invention is to provide a tachometer of simple, durable, and inexpensive construction.

A further object of my invention is to provide a tachometer which is especially suited to register the speed of a rotating member at a point remote therefrom, as in a tri-motored airplane installation.

The ordinary tri-motored airplane is provided with one engine at the forward end of the fuselage and a pair of engines mounted in nacelles secured underneath each wing a considerable distance from the fuselage. A pilot's compartment is provided rearwardly of the center engine and an instrument board is disposed in this compartment upon which three tachometer heads are mounted, one for each motor. Flexible driving shafts are extended from these tachometers to their respective motors which necessitates extremely long shafts for the wing motors. These drive shafts not only add considerable weight to the plane but, due to their tortuous paths from the fuselage to the engine nacelles beneath the wings, frequently get out of order and need to be replaced.

With my improved tachometer no flexible drive shaft is used, there being only a single wire connecting the rotating member with the tachometer head on the instrument board. The advantages of this device for use as a tri-motored airplane tachometer are apparent because the single wire connecting the wing engines with the instrument board may be bent around sharp corners or threaded through inaccessible places without the danger of ever needing replacement.

Still, a further object of my invention is to provide a tachometer consisting of a direct current generator having no brushes, slip rings, or commutator, which is driven by the rotating member of which the speed is desired. This generator is connected by a single wire to a direct current voltmeter which is calibrated to register revolutions per minute of the driving member.

The disadvantage of using an ordinary series wound direct current generator in place of my improved generator is that brushes are of course required on the series generator and due to their wear, a variable output is obtained from the generator. Further, only a small and inexpensive apparatus is desirable, and consequently, the current output of such device will be small, thereby making any current loss in the brushes a considerable factor for error.

If an alternating current generator having no brushes were used an alternating current meter would be required. Alternating current meters operate on an entirely different principle than direct current meters and are extremely delicate and expensive pieces of apparatus. A much greater amount of current is required to operate these alternating current meters than direct current meters and consequently, a generator many times heavier than the applicant's would be needed if an alternating current system were used.

Still a further object of my invention is to provide a tachometer consisting of a small generator in which the small alternating current output is rectified by a pair of dry disc rectifiers thereby producing a direct current output which may be read on a relatively inexpensive and accurate meter. It is believed that this device wherein an alternating current generator is provided with a dry disc rectifier, instead of the conventional commutator and brushes, is new. As there are no brushes, slip rings or commutator used with this device, a reliable current output is obtained.

A further object of my invention is to provide a tachometer which has a high degree of accuracy and which will be unaffected by the temperature changes in the device. The ordinary tachometer of the magnetic or air friction type is affected considerably by temperature changes so that a high degree of accuracy cannot be obtained in them.

In a tri-motored airplane installation it is extremely important that the speed of the two wing motors be exactly uniform otherwise the ship will gradually swerve from its course. The ordinary tachometer is not accurate within the limits desired in this installation and consequently, a device having a higher degree of accuracy is desirable.

Great accuracy is obtained with this device because of a compensating resistance placed within the generator housing which corrects the output of the generator due to various operating temperatures of the rectifier.

The rectified current output of dry disc rectifiers varies about 5% for a given current input, that is, the output when the rectifier is warm will be about 5% greater than when the rectifier is cold. If no compensating device were provided the reading of the tachometer head would vary proportionately. In this device a nickel resistance wire unit is placed inside of the generator housing so that the temperature of this wire will vary directly with the temperature of the generator and rectifier. The resistance of nickel wire is proportional to its temperature. The current output of the generator is conducted through this nickel wire unit to the rectifier so that as the temperature of the generator and rectifier increases the resistance of the unit also increases to thereby secure a uniform output for the rectifier. The size and length of this resistance wire may be correctly proportioned so that a constant output is obtained for all working temperatures of the rectifier for the same speed. The current output of the generator decreases a small amount due to its temperature rise but this is more than offset by the increased rectification of the rectifier for the same rise in temperature. The increased resistance of the nickel wire compensates for the greater rectification after allowance is made for the decreased current output of the generator.

With these and other objects in view, my invention consists in the construction, arrangement, and combination of the various parts of my improved device, as described in the specification, claimed in the claim, and illustrated in the accompanying drawing, in which:

Figure 1 shows an installation of my improved device, the generator being mounted on a motor remote from the tachometer head.

Figure 2 shows a vertical central sectional view through the generator shown in Figure 1.

Figure 3 shows a rear elevation of the generator shown in Figure 1, the cover of the generator being removed to better illustrate the construction.

Figure 4 shows a sectional view taken on the line 4—4 of Figure 2.

Figure 5 shows a sectional view taken on the line 5—5 of Figure 2, and

Figure 6 shows the electrical wiring diagram of the device.

This device consists of two units, the generator and the tachometer head. The latter unit consists of an ordinary voltmeter which has been calibrated to register revolutions per minute instead of volts. The structural features of the tachometer head will not be described because it differs from a standard voltmeter only in the markings on its dial. However, the generator used in this device differs in numerous ways from any existing generator of which the applicant has knowledge, and these differences will be brought out in the specification.

Referring to the accompanying drawing, I have used the reference numeral 10 to indicate generally an engine having my generator unit mounted thereon adjacent to one of the revolving members of the engine. A wire 11 connects this generator with a tachometer head 12 mounted on an instrument board 65. Suitable characters 30 are printed on the dial of the head 12 which register the revolutions per minute of the motor 10.

The generator provided with this device consists of a circular base plate 13 having a pair of ears 14 extending therefrom. Openings 15 are provided in the ears 14 so that the base plate 13 may be secured to the engine 10 by means of screws or the like. An annular ring 17 projects rearwardly from the base plate 13 and a cup shaped housing 16 is secured thereto by means of suitable screws 18. A dust free enclosure is thereby provided to house the rotating parts of the generator. A ball bearing assembly 19 is centrally mounted in the base plate 13 and a cap 20 is secured over this bearing to protect same from dust or dirt.

Four bosses 21 extend rearwardly from the base plate 13 within the ring 17 and a screw 22 is threaded into each of the bosses and secures the field cores and windings to the base 13.

A bracket 23 extends between one diagonally opposite pair of the screws 22. A ball bearing assembly 24 is mounted in a recess 25 formed in the center part of the bracket 23. An armature shaft 26 is rotatably mounted by means of the ball bearings 19 and 24 and extends forwardly through the cap 20. Splines 27 are formed on the forward end of the shaft 26 so that the latter may be readily connected to the rotating member of the engine 10.

That portion of the armature shaft between the bearings 19 and 24 is provided with external threads and a pair of nuts 28 are threaded thereon adjacent to these bearings. The armature proper consists of a plurality of laminations 29 mounted on the shaft 26 between the unts 28. Armature teeth 31 are formed in the laminations 29 in the conventional manner.

A two part laminated field core is provided, the parts being of opposite polarity and placed diametrically opposite adjacent to the teeth 31. One of the field core parts consists of a plurality of laminations 32 which are secured to the base plate 13 by means of two of the screws 22. A number of teeth 33 are formed in the inner face of these laminations 32 in position so that the armature teeth 31 will revolve in close proximity to the ends of these teeth 33.

A second series of field laminations 34 are secured to the base plate 13 by means of two remaining screws 22 and teeth 35 are formed in these laminations in position to co-act with the lower side of the armature.

Each end of a pair of permanent bar magnets 36 are connected to the field laminations 32 and 34, the two like poles of the magnets being connected to the same field core. Thus, the laminations 32 will be of one polarity while the laminations 34 will be of the opposite polarity. The magnetic flux will then travel from the magnets 36 through one of the field cores, then through the armature 29 and to the other field core and back to the magnets 36.

In the form of device here shown, six teeth 31 are provided on the armature 29 and each field core is provided with five teeth.

Field coils 37 are provided around each alternate tooth 33 of the laminations 32 and are connected in series with each other. Similar field coils 38 are provided around each alternate tooth 35 of the laminations 34 and are likewise connected in series. The remaining teeth of the field cores 32 and 34 are given the numerals 39 and 40, respectively.

The voltage generated in the coils 37 and 38 is proportional to the rate of change in the flux in the teeth 33 and 35. When the armature 29 is in the position shown in Figure 4, the flux travels through the teeth 33 to the teeth 31 of the armature 29 and then to the teeth 35. When the armature 29 rotates one twelfth of a revolution, the teeth 31 will be adjacent to the teeth 39 and 40 so that the flux will travel through these teeth to the armature and so that no flux will travel through the teeth 33 and 35 which are provided with field coils.

Referring to the coils 37, when the teeth 31 approach the teeth 33 the rate of change of the flux travelling therebetween increases and builds up a voltage in the coils 37. The greatest voltage is at that point where the rate of change in the flux is greatest. When the center line of the teeth 31 and 33 coincide, the flux is then at a maximum and the rate of the change of flux is of course zero thereby producing no voltage.

As the teeth 31 rotate away from the teeth 33, the rate of change of the flux again increases and generates a current in the coils 37 which flows in the opposite direction to that current generated when the teeth 31 approached the teeth 33. When the teeth 31 coincide with the teeth 39, no flux travels through the teeth 33 thereby producing no voltage in the coils 37. A complete alternating current cycle is thus induced in the windings 37, the frequency of which is the product obtained from the number of teeth 31 times the revolutions per minute of the armature 29.

All of the field coils 37 and 38 being wound in the same direction, an opposite phase current will be simultaneously induced in each group of these coils as the rotor revolves.

A rectifier unit is secured to the rear face of the housing 16 and consists of three lead discs 41 alternated with two copper oxide discs 42. The outer lead disc 41 is provided with an extension 43 for conducting the current from the rectifier. An insulating washer 44 is provided next to the disc 43 and a second rectifying unit, consisting of three lead discs 45 alternated with two copper oxide discs 46, is placed rearwardly of the washer 44. The inner lead disc 45 is also provided with an extension 47 through which current is conducted from this rectifying unit. An aluminum disc 48 is placed rearwardly of the second rectifier unit.

A bolt 49 extends through the housing 16 and its head 50 is recessed in the inner side of this housing 16. The outer end of the bolt 49 extends through both of the rectifier units and an insulating bushing 51 is placed around the bolt 49 adjacent to the lead and copper oxide discs. A spring washer 52 co-acts with a nut 53 threaded on the outer end of the bolt 49 so that a variable pressure may be exerted on the discs of the two rectifier units.

The arrangements of these various discs is such that current may flow either from the housing 16 through the discs 41 and 42, and through the extension 43 or from the housing 16 through the bolt 49, discs 48, 45 and 46 to the extension 47. However, current will not be permitted to flow from either of the extensions 43 or 47 to the housing 16, as is well known in the rectifying art.

A ring of insulating material 54 is secured in the housing 16 by means of the four screws 22 in position adjacent to the field laminations 32 and 34. A pair of contact members 55 and 56, respectively, are mounted diametrically opposite in the ring 54, the member 55 being connected to the adjacent end of field coils 38, while the contact member 56 is connected to the adjacent end of the field coils 37. A pair of insulating bushings 57 are secured in the housing 16 adjacent to the contact members 55 and 56 and a pair of plungers 58 and 59 are reciprocally mounted in these bushings in position to co-act with the members 55 and 56, respectively. The outer end of the plunger 58 is secured to the extension 47, while the outer end of the plunger 59 is secured to the extension 43. Sufficient flexibility is allowed in these extensions so that the plungers will be constantly urged against the contact members 55 and 56. Thus the housing 16 may be assembled or removed from the base 13 and contact will automatically be made or broken between the rectifying unit and the field coils of the generator.

A groove 60 is formed in the outer edge of the ring 54 and a length of nickel wire 61 is wound in this groove. One terminal of the wire 61 is connected to the free terminals of the coils 37 and 38, and the other terminal of the wire 61 is connected to a terminal 62 secured in the housing 16 but insulated therefrom. This terminal is of ordinary construction having an insulating bushing 63 secured in the housing 16 and having a pair of nuts 64 threaded onto the outer end of the terminal by which the wire 11 extending from the tachometer head is secured thereto.

The length and size of the wire 61 is so proportioned that the increased output of the generator, due to an increased operating temperature will be exactly counteracted by the increased resistance of the wire, due to the external heat applied thereto from the generator.

The operation of the device is as follows: The motor 10 rotates the armature shaft 26. As the teeth 31 approach the teeth 33 and 35 a voltage is generated in the coils 37 and 38 in the direction shown by the arrows 66. The current generated in the coils 37 is conducted through the contact member 56 to the extension 43 of the rectifier unit where it is prevented from completing the circuit with the ground. The current generated in the coils 38 is of the opposite phase and flows through the wires 61 and 11 to the tachometer head 12 and then to the ground and completes the circuit through the rectifier discs 45 and 46.

Further rotation of the armature teeth 31 away from the teeth 33 induces current in the coils 37 and 38 in the direction opposite to that shown by the arrows 66. The current generated in the coils 37 is then conducted through the wire 61 to the tachometer head 12 while the current generated from the coils 38 is stopped by the rectifier unit discs 45 and 46. A pulsating uni-directional current is thus sent through the wire 61 to the head 12.

The voltage generated by this device is directly proportional to the rate of change of flux, and as the rate of flux is directly proportional to the speed of rotation of the armature, it follows that the voltage produced will be in exact proportion to the speed of rotation of the motor 10. The head 12 is calibrated to read in revolutions per minute instead of in volts so that a direct reading may be obtained with the instrument.

Many advantages arise through the use of my improved device and it may be well to point out some of these advantages. Greater accuracy is obtained with this device in comparison to the magnetic and air friction type tachometers now in common use. Further, this device is especially adapted for installations wherein it would be difficult to provide a flexible driving shaft between the rotating member and the instrument board, as in connection with the wing motors of a tri-motored airplane.

A further advantage is gained because all parts of the device are rugged and remain unaffected by those conditions which affect the ordinary tachometer.

Still, a further advantage results because, the output of the generator being direct current, a simple and inexpensive voltmeter may be used which requires a very small amount of current thereby decreasing the size and weight of the generator. Further, a compensating resistance is provided which corrects the variable output of the machine due to different operating temperatures.

Some changes may be made in the arrangement, construction, and combination of the various parts of my improved device, and it is my intention to cover by my claim such changes as may reasonably be included within the scope thereof.

I claim as my invention:

In a direct current generator adapted to be secured directly to the body of an internal-combustion engine and to produce a substantially uniform output for each speed thereof irrespective of the varying temperature of said engine, a housing, a permanent magnetic field core in said housing forming an open magnetic circuit, an induced winding on said core, an inductor element rotatably mounted in said housing, the rotation of which alternately opens and closes said magnetic circuit thereby inducing alternating current into said winding, a dry disc-type rectifier secured to the exterior of said housing, one terminal of which is grounded and the other terminal of which is connected to one end of said induced winding whereby the other end of said winding will form the output terminal of the generator, a ring disposed within said housing, and a length of nickel resistance wire wound around said ring and connected in series with said output terminal, the resistance of said nickel wire when hot being computed so that the increased resistance of said wire will exactly compensate for the increase in rectification of said rectifiers when not over the decreased output of said generator when at the same temperature.

EDWARD S. HUFF.